United States Patent [19]

Feeley et al.

[11] Patent Number: 5,384,300
[45] Date of Patent: Jan. 24, 1995

[54] STABILIZED CATALYST CARRIER AND IMPROVED CARRIER CONFIGURATION FOR CATALYTIC COMBUSTION SYSTEM

[75] Inventors: Jennifer S. Feeley, Clinton; Dianne O. Simone, Edison; Leonard M. Quick, Bridgewater; Martha M. Hamil, Highland Park, all of N.J.

[73] Assignee: Engelhard Corporation, Iselin, N.J.

[21] Appl. No.: 54,374

[22] Filed: Apr. 28, 1993

[51] Int. Cl.⁶ .......................... B01J 21/00; B01J 23/40
[52] U.S. Cl. ...................................... 502/252; 502/251
[58] Field of Search ............................ 502/1, 251, 252

[56] References Cited

U.S. PATENT DOCUMENTS

| | | | |
|---|---|---|---|
| 2,529,283 | 11/1950 | Corner et al. | 502/251 |
| 2,958,648 | 11/1960 | Braithwaite | 502/251 |
| 3,056,646 | 10/1962 | Cohn et al. | 23/2 |
| 3,928,961 | 12/1975 | Pfefferle | 60/39.02 |
| 4,019,316 | 4/1977 | Pfefferle | 60/39.02 |
| 4,065,917 | 1/1978 | Pfefferle | 60/39.82 |
| 4,154,568 | 5/1979 | Kendall et al. | 431/7 |
| 4,444,899 | 4/1984 | Yamada et al. | 502/252 |
| 4,774,217 | 9/1988 | Takeuchi et al. | 502/252 |
| 4,893,465 | 1/1990 | Farrauto et al. | 60/39.02 |
| 4,956,329 | 9/1990 | Chao et al. | 502/251 |
| 5,079,064 | 1/1992 | Forsythe | 428/131 |
| 5,102,639 | 4/1992 | Chou et al. | 423/263 |

FOREIGN PATENT DOCUMENTS

| | | | |
|---|---|---|---|
| 0190239 | 9/1985 | Japan | 502/252 |
| 0666380 | 2/1952 | United Kingdom | 502/251 |

*Primary Examiner*—Carl F. Dees

[57] ABSTRACT

A catalyst member for use in processes for the catalytic combustion of gaseous carbonaceous fuels is made from a stabilized carrier having a plurality of gas flow passages extending therethrough defined by channel walls and a catalyst material disposed on the channel walls, wherein the carrier is stabilized against interaction with the catalyst material. The stabilized carrier may be prepared from a monolith comprising silica, magnesia and alumina that has a coating of alumina on the channel walls and by subjecting the coated monolith to stabilizing conditions. The stabilizing conditions may include exposure to high temperature steam.

16 Claims, 5 Drawing Sheets

FRESH

FRESH
A3

SPENT

SPENT
A3

SPENT P-2

SPENT P3

SPENT Q3

SPENT Q4

STABILIZED CATALYST CARRIER AND IMPROVED CARRIER CONFIGURATION FOR CATALYTIC COMBUSTION SYSTEM

BACKGROUND OF THE INVENTION

1. Field of the Invention

The present invention relates to an apparatus and process for the catalytically supported combustion of gaseous carbonaceous materials, including natural gas and methane. In a more specific aspect, this invention relates to an apparatus and process for catalytically supported combustion of natural gas or methane using a supported palladium oxide catalyst.

2. Description of Related Art

Catalytically supported combustion processes have been described in the prior art, e.g., see U.S. Pat. No. 3,928,961 to Pfefferle and U.S. Pat. Nos. 4,065,917 and 4,019,316. The use of natural gas or methane in catalytic combustion has been taught in the art, as has the use of a palladium catalyst to promote such combustion oxidation. See U.S. Pat. No. 3,056,646 to Cohn, wherein the use of palladium catalyst to promote methane oxidation is disclosed, as is an operable temperature range of 271° C. to 900° C. (see column 2, lines 19–25).

U.S. Pat. 4,154,568 to Kendall et al, dated May 15, 1979 discloses a catalyst bed design comprising a plurality of carrier monoliths in the flow stream of the air/fuel mixture, wherein the channel size in respective monoliths decreases progressively for monoliths at progressively downstream positions, to provide substantially complete combustion in the catalyst bed (see column 1, lines 47–59).

SUMMARY OF THE INVENTION

The present invention relates to the preparation and use of a catalyst member for the catalytically initiated combustion of a combustion mixture comprising a gaseous carbonaceous fuel and air. The catalyst member according to this invention is used in a combustion apparatus designed to promote such combustion by flowing the combustion mixture through the device, and through the catalyst member. The catalyst member comprises a catalyst material disposed on the walls of a carrier which has been stabilized against interaction with the catalyst material.

More specifically, the present invention provides an improvement in a catalyst member comprising a carrier comprising a silica-alumina-magnesia material and having a plurality of gas flow passages extending therethrough defined by channel walls and a catalyst material comprising a catalytic component disposed on the channel walls and effective to catalytically support the combustion of a gaseous carbonaceous fuel. The improvement comprises that prior to applying the catalyst material to the carrier, a coating comprising alumina is applied to the channel walls and the alumina-coated carrier is exposed to steam for a time and under conditions sufficient to induce the alumina to interact with the silica-alumina-magnesia material so that the carrier is stabilized against interaction with the catalyst material.

According to one aspect of the invention, the silica-magnesia-alumina material may comprise from about 20 to 40 weight percent silica, from about 3 to 6 weight percent magnesia and from about 54 to 77 weight percent alumina, with from about 50 to 90 percent by weight of each of said silica, magnesia and alumina comprising crystalline material, the balance comprising amorphous material. The crystalline material may comprise from about 15 to 40 percent by weight cordierite, from about 15 to 35 percent by weight corundum and from about 10 to 30 percent by weight mullite, based on the weight of the carrier.

According to another aspect of the invention, exposure to steam may comprise exposure to a mixture of from about 5% to 40% steam in air at a temperature of from about 1200° C. to 1350° C. for a period of 2 to 60 hours at about 1 atm pressure. For example, exposure to steam may comprise exposure to a mixture of from about 5% to 15% steam in air at a temperature of from about 1250° C. to 1350° C. for a period of 2 to 24 hours at about 1 atm pressure. In a particular instance, exposure to steam may comprise exposure to about 10% steam in air at about 1300° C. for about 12 hours at about 1 atm pressure.

According to still another aspect of the invention, the catalytic component may comprise a palladium catalytic component and/or alumina.

The present invention also has a method aspect for making a catalyst member for use in the catalytically supported combustion of gaseous carbonaceous fuels. The method comprises preparing a stabilized carrier by applying a coating comprising alumina to the channel walls of a carrier comprising a silica-alumina-magnesia material and having a plurality of gas flow channels therethrough defined by channel walls, and exposing the alumina-coated carrier to steam for a time and under conditions sufficient to induce the alumina to interact with the silica-alumina-magnesia material to stabilize the carrier against interaction with a catalyst material. Then, a catalyst material comprising a catalytic component effective to catalytically support the combustion of a gaseous carbonaceous fuel is applied to the channel walls of the stabilized carrier, to thereby produce the catalyst member.

The present invention also provides a process for the catalytically supported combustion of a gaseous carbonaceous fuel. The process comprises (a) forming a gaseous combustion mixture comprising the fuel and oxygen, (b) contacting the combustion mixture in a catalyst zone with at least one catalyst member comprising a stabilized carrier as described above under conditions suitable for catalyzed combustion of the combustion mixture, thereby effecting sustained combustion of at least a portion of the fuel in said combustion mixture without substantial formation of oxides of nitrogen.

As used herein and in the claims, the terms "upstream" and "downstream" refer to the relative placement of elements sensed in the direction of flow of the combustion mixture through a catalyst apparatus according to the invention.

DETAILED DESCRIPTION OF THE INVENTION AND SPECIFIC EMBODIMENTS THEREOF

Figure 1:
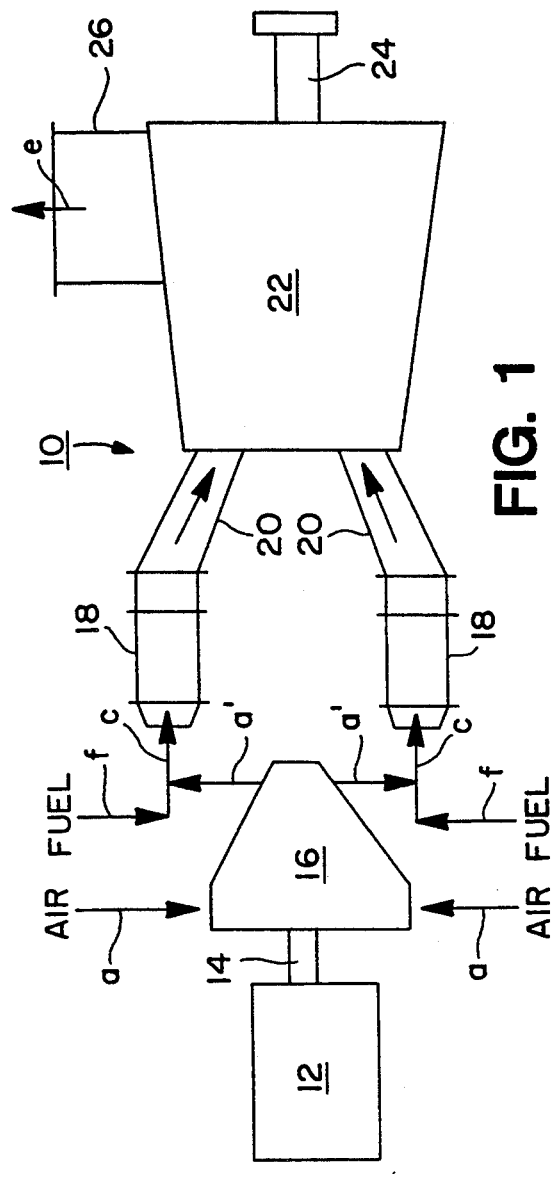
FIG. 1 is a schematic plan view of a gas turbine unit utilizing catalytic thermal combustors in accordance with one aspect of the present invention.

Burning of carbonaceous fuels is associated with formation of air pollutants, among the most troublesome of which are nitrogen oxides ($NO_x$). Nitrogen oxides form oxides involves catalytic post-treatment to reduce $NO_x$ to whenever air-supported combustion takes place at open-flame temperatures. One approach to eliminating nitrogen oxides involves catalytic post-treatment to reduce $NO_x$ to nitrogen. A more economical method is to operate the combustion process catalytically, at a temperature lower than open-flame temperatures.

It has long been realized that little or no $NO_x$ is formed in such a system. Typically, such catalytic combustion of natural gas or methane, for example, utilizes a preburner or thermal combustor which employs flame combustion to preheat combustion air to a temperature of 400° C. to 500° C. or higher. Once the catalyst is sufficiently hot to sustain catalysis, the preburner is shut down and all the fuel and air are directed to the catalyst. Such a acceptable levels the $NO_x$ formation which occurs at the catalytic combustor, if operated at temperatures below about 1300° C. to 1500° C., avoids or at least controls to higher temperatures which are characteristic of the flame combustion. However, such catalytic combustion which will function effectively at a high space velocity has heretofore been generally regarded as commercially unattractive. Reasons for this lack of commercial attractiveness include the difficulty of economically combusting methane, the principal component of natural gas, and the deactivation and instability of the catalyst compositions employed, especially in the high-temperature end of the catalyst bed where severe high temperatures may be reached. Because of the susceptibility of the catalyst to such thermal deactivation, many catalytic combustor designs are limited with respect to the type and amount of fuel they can combust in order to avoid deleterious high temperatures.

The combustor according to the present invention comprises a catalyst zone where heterogeneous combustion of the combustion mixture is catalytically initiated, and a downstream zone where homogeneous combustion occurs, supported by the heterogeneous combustion reaction. A catalyst body is disposed in the catalyst zone and comprises at least a first catalyst member comprising a carrier coated with a catalyst material. Generally, the catalyst material comprises a catalytic component, such as a palladium catalytic component such as palladium oxide, dispersed on a support material comprising a relatively inert refractory inorganic oxide such as alumina, which is optionally impregnated with stabilizers, promoters or other additives. Other support materials such as silica, titania, umimpregnated zirconia, zirconia impregnated with a rare earth metal oxide, ceria, co-formed rare earth metal oxide-zirconia and combinations thereof may also be employed. The palladium oxide is dispersed on the support material in a conventional manner, e.g., by impregnating particles of the support material with a solution of a soluble palladium compound and then calcining the impregnated material. Other catalytically active metals or metal oxides may be present in the catalytic component and may accompany the palladium oxide in the palladium catalytic component.

A typical procedure for preparing a palladium oxide-on-alumina catalyst is described in U.S. Pat. No. 4,893,654, the disclosure of which is hereby incorporated herein by reference. This Patent teaches that $\gamma$-alumina (gamma) is pre-calcined at 950° C. for 2 hours and then screened to particle sizes of between 50 and 150 microns. This calcined alumina is used as a catalyst carrier. The use of y-alumina as a catalyst carrier, as those skilled in the art will readily appreciate, is simply a matter of choice. Other suitable carriers include, for example, modified alumina (i.e., aluminas which contain surface area stabilizers such as silica, barium oxide, lanthanum oxide and cerium oxide), zeolites, and the other materials cited above, as well as mixtures of any of the foregoing. The carrier, e.g., the alumina, is typically impregnated with a $Pd(NO_3)_2 \cdot 6H_2O$ solution by the incipient wetness method to give approximately 4 weight percent Pd on the finished catalyst. The Pd is then fixed on the carrier by a conventional reduction with an aqueous hydrazine solution. The reduced catalyst is dried at 120° C. overnight and calcined at 500° C. for 2 hours. The resulting powder may then be made into an aqueous slurry which is then coated onto a honeycomb carrier, which is then dried and calcined.

Thermally stabilized support materials are generally better suited for use at a relatively downstream position in the catalyst zone then their non-stabilized, unimpregnated counterparts. Further still, alternative active components may be employed, especially in relatively downstream positions, such as binary oxides of palladium and rare earth metals, which may be produced by a solid state reaction of palladium oxide with a rare earth oxide, e.g., samaria, lanthana and/or praseodymia. Catalysts of this type are disclosed in co-pending, commonly assigned U.S. patent application Ser. No. 07/684,409 filed Apr. 12, 1991 the disclosure of which is hereby incorporated herein by reference, and in commonly assigned U.S. Pat. No. 5,102,639, the disclosure of which is incorporated herein by reference. These alternative active components are preferrably disposed downstream of a palladium oxide active component. Such alternative catalyst materials usually comprise a refractory metal oxide binder such as alumina to bind the material to the carrier.

As will be illustrated below, the catalyst zone may comprise additional catalyst members which may comprise catalyst materials which may be the same or different from the first catalyst material. The catalyst members are adapted to initiate in the catalyst zone catalytically-supported, i.e., heterogeneous, combustion at the surfaces thereof and to support homogeneous combustion in the downstream zone, thus helping to avoid exposing catalyst compositions to deactivating temperatures and to limit the production of nitrogen oxides.

It should be noted that a combustor according to the present invention may find utility not only for combusting methane or natural gas, but also for other fuels, e.g., number 2 fuel oil, jet fuel, normally liquid hydrocarbon fuels, alcohols, e.g., methanol, oxygenated hydrocarbons and even hydrogen, which may be reacted with carbon monoxide.

The carrier provides a substrate on which the catalyst composition is carried, and typically takes the form of a monolith having a plurality of fine gas flow passages extending therethrough, to provide a honeycomb-type structure. The gas flow passages (sometimes referred to as "cells") in the honeycomb structure are substantially parallel and defined by thin walls, and may be of any desired cross section such as square, rectangular, triangular or hexagonal shape. The number of channels per square inch of face surface, i.e., per cross-sectional square inch (cpsi), may vary, depending upon the particular application for which the catalyst bed is to be used. Such honeycomb-type carriers are commercially available having anywhere from about 9 to 600 or more cpsi. The substrate or carrier monolith desirably is porous and may (but need not) be relatively catalytically inert to the combustion reaction as compared to the active layers used in the invention.

Generally, a carrier used in a combustor should be refractory in nature, i.e., able to withstand thermal shock caused by the sudden increase or decrease in temperature experienced at start-up and shut-down of the combustor. The carrier should also have good thermal strength so that it does not develop structural flaws at the operating temperatures of the combustor, i.e., temperatures as high as 1300° C. to 1500° C. Conventional cordierite monoliths such as those used to support three-way catalysts for treating the exhaust gases of automotive internal combustion engines are generally not considered to be suitable in combustors of the present invention because they can melt or otherwise fail at combustor operating temperatures. Conventional carriers for use in combustors may comprise a combination of cordierite and other oxide materials, e.g., a mixture of alumina, mullite and cordierite. Such carriers have physical properties better suited to combustor operation than conventional ceramic substrates, typically used to carry catalysts used in the treatment of automotive exhaust gases, i.e., they exhibit better thermal strength and thermal shock resistance, and are commercially available, e.g., from the Dupont Company under the designation PRD-66. An elemental analysis of this material provided by the Dupont Company describes the material containing 70.4 weight percent $Al_2O_3$, 24.9 weight percent $SiO_2$ and 4.2 weight percent $MgO$. However, another analysis resulted in proportions of about 62.7–63.4 weight percent $Al_2O_3$, 31.2–31.3 weight percent $SiO_2$ and 5.4–5.7 weight percent $MgO$. Approximately 50 to 90 percent by weight of each of the $SiO_2$, $MgO$ and $Al_2O_3$ may comprise crystalline material, the balance comprising amorphous material. Typically, the crystalline material comprises 15 to 40 percent cordierite, 15 to 35 percent corundum and 10 to 30 percent mullite by weight of the carrier. A more detailed description of this material may be found in U.S. Pat. No. 5,079,064, the disclosure of which is hereby incorporated herein by reference. Carriers comprising such materials are sometimes referred to herein as Type I carriers.

The Applicants have discovered a mode of failure of catalyst members by physically examining the catalyst members after they have been subjected to combustor operating conditions. Specifically, they have found that upon exposure to excessively high temperatures or over the course of prolonged use, some catalyst materials react with the carrier on which they are coated. The reaction, sometimes referred to herein as an interaction, has been observed between catalyst materials comprising alumina and Type I carriers. These catalyst members not only exhibit the primary indication of failure, i.e., a significant reduction in catalytic ability to initiate combustion, but sometimes also exhibit a significant loss in the structural integrity of the catalyst member as well as a loss of significant quantities of catalytic metal from the catalyst material. These effects tend to increase as the catalyst member is placed at points further downstream within the catalyst zone, since the combustion reaction progresses as the combustion mixture flows downstream through the combustor, establishing an increasing temperature gradient at progressively downstream positions.

The Applicants have made the surprising discovery that a "spent" Type I monolith, i.e., a Type I monolith which has been coated with an alumina-containing material and subjected to conditions leading to interaction between the coating and the monolith, can itself be used as a carrier for a fresh coating of alumina-containing material, and that when again subjected to such conditions, the resulting coated member exhibits a superior degree of resistance to interaction with the fresh coating material. Accordingly, the present invention is directed in part to a process for stabilizing carrier monoliths against interaction with a coating material to be applied thereon, the method comprising applying a stabilizing coating material onto the monolith and subjecting the coated monolith to stabilizing conditions, i.e., conditions leading to interaction between the stabilizing coating and the monolith and resulting in a higher degree of stability against interaction with subsequent coatings. The thus stabilized carriers can then be coated with, e.g., catalyst materials and will exhibit improved resistance to interaction with the coating thereon.

Any suitable method for inducing the desired stabilizing interaction may be employed, including subjecting the coated unstabilized monolith to combustion conditions, e.g., by employing a Type I monolith in a combustor as a carrier for an alumina-containing coating, and placing the coated monolith in a combustor until it is "spent" i.e., until at least a limited stabilizing degree of monolith washcoat interaction has occurred to produce a stabilized carrier. This particular method is sometimes referred to herein as "in situ" stabilization. The in situ stabilized carrier may then be "recycled" by the application of a fresh coating of catalyst material. Alternatively, the stabilizing effect can be produced by subjecting an initially coated Type I monolith to high temperature steam. The use of steam is intended to simulate conditions which lead to monolith-washcoat interaction in the combustor, where water is one of the combustion products and is believed to foster the interaction that has been observed. Such treatment, sometimes referred to herein as "ex situ" stabilization, can be accomplished by coating and calcining the monolith, and then exposing the coated monolith to steam at a concentration from about 5% to 15% in air at a temperature of 1250° C. to 1350° C. for a period of 2 to 24 hours, at about 1 atm pressure. It is believed that for a stabilization process run at 1 atm pressure, the desired stabilization can be attained with, variously, from about 5% to 40% steam in air, at temperatures between from about 1200° C. to 1350° C., and with exposure periods of from about 2 to 60 hours. Those skilled in the art, guided by the present disclosure, will appreciate that these process conditions might be further varied, as may be the pressure at which the process is carried out while still providing the desired stabilizing interaction, and that the limits of such variations can be determined without undue experimentation, given the guidance of the present disclosure. By employing monoliths that have been stabilized in either of these ways as carriers on which fresh washcoat materials may be applied, the Applicants have produced catalyst members which exhibit greater stability under combustion conditions than conventional Type I monoliths.

While the stabilized carrier substrate according to the present invention provides a particular advantage in resisting interaction with coatings thereon comprising alumina, it is believed that such stabilized carrier substrates will be useful and advantageous with respect to non-alumina-containing coatings as well, due to the superior physical integrity imparted to the substrate by the stabilization process, as described herein.

In a co-pending application Ser. No. 08/026,376 filed Mar. 4, 1993, the Applicants disclose the discovery of another carrier monolith that exhibits significantly less interaction with alumina-containing catalyst materials than Type I carriers. Such monoliths are available from the Minnesota Mining and Manufacturing Co. (3M) under the trade designation "Siconex," and are described by the manufacturer as being formed from a series of layers of woven alumina-boria-silica inorganic fibers disposed in a silicon carbide matrix, and designate these as Type II monoliths. Type II monoliths are disclosed therein as resisting interaction with washcoat materials disposed thereon, but are not in themselves part of the present invention.

As indicated above, the catalyst body in a combustor may comprise more than one catalyst member. Since the operating temperature in the combustor increases at points progressively downstream in the combustor, it is preferable to emplace catalyst members in the catalyst zone in a sequence in which the catalyst members exhibit increasing thermal stability at points increasingly downstream in the combustor. Co-pending patent application Ser. No. 08/022,248 filed on Feb. 25, 1993 addresses various catalyst materials and their advantageous relative sequence in the catalyst bed, and the disclosure of that application is hereby incorporated herein by reference. Briefly restated, the cited patent application teaches that catalyst materials should be disposed in relative upstream-downstream relation in order of at least one of decreasing activity, increasing thermal stability (i.e., escalating degradation temperature), or escalating and preferably overlapping regeneration temperature ranges. This application also discloses the utility of palladium oxide as the active component of a catalyst material comprising palladium oxide dispersed on a support material.

The present invention serves, in another aspect, to alleviate catalyst failures by providing a thermal buffer or separator body disposed in a separator zone situated between the catalyst zone where the catalyst body is disposed and the downstream zone where high temperature homogeneous combustion occurs. The separator body is described more fully in U.S. patent application Ser. No. 08/024,707, filed Mar. 1, 1993, which is hereby incorporated by reference. Briefly restated, the separator body preferably comprises a monolith similar in configuration to the carriers on which catalyst material is deposited to form a catalyst member, i.e., it may take the form of a honeycomb monolith having a plurality of parallel gas flow passages extending therethrough. The separator body is made of a material that can withstand exposure to the high temperatures produced by the homogeneous combustion that occurs in a downstream zone of the combustor. Due to its placement between the catalyst zone and the downstream zone where homogeneous combustion occurs, the separator body acts as an insulator to partially insulate the catalyst body from the heat released by the homogeneous reaction. Advantageously, the separator body is not a catalyst member, i.e., it does not comprise catalytically active materials, since such materials tend to be vulnerable to deactivation when exposed to the temperatures that the separator body sometimes experiences. Thus, even when the temperature in the downstream zone is excessive, the likelihood of thermal deactivation of the catalyst body and the associated loss in combustion efficiency is diminished. To achieve this effect, the separator body is disposed in close proximity or in abutting relation to the catalyst body.

Preferably, the first catalyst member, each optional catalyst member and the separator body are discrete bodies within the combustor. For example, the first catalyst member will preferably comprise the first catalyst composition disposed on the first carrier and the second catalyst member will likewise comprise the second catalyst composition on a separate second carrier. Then, the first catalyst member and the second catalyst member may be disposed within the combustor in either closely proximate or abutting upstream/downstream relation to one another. Alternatively, the first catalyst member and the second catalyst member may be formed on a single, integral monolith by applying a coating of the first catalyst composition on one end of the monolith and a coating of the second catalyst composition on the other end of the monolith. The separator body, which also comprises a refractory body having a plurality of gas flow channels extending therethrough, may likewise be part of a single monolith integral with the second or most downstream catalyst member, with catalyst material being deposited on only one end of the monolith to provide a catalyst member, and the other end providing the separator body.

Referring now to FIG. 1 there is shown in schematic plan view a gas turbine 10 comprising a starter engine 12 connected by an engine shaft 14 to an air compressor 16, which is provided with inlet air, via air inlet lines indicated by arrows a, which is compressed by compressor 16 and discharged via lines a' into combustion gas inlet lines c which are also supplied with a pressurized gaseous fuel, such as natural gas or methane, via gas inlet lines indicated by arrows f. The air and fuel combine to form a combustion mixture which is introduced via lines c into a plurality of catalytic thermal combustors 18, two of which are illustrated in FIG. 1 although it will be appreciated that any suitable number may be employed. For example, eight such combustors 18 may be utilized with their outlets disposed equiradially about the inlet to the turbine. Each catalytic thermal combustor 18 is provided with an associated outlet duct 20 connected in gas flow communication with a turbine 22 which may comprise a multi-staged turbine as well-known to those skilled in the art. Turbine 22 is drivingly connected to a load coupling shaft 24 to connect the turbine output to a suitable device, for example, an electric generator. The expended combustion products are exhausted as shown by arrow e via exhaust stack 26 for discharge to the atmosphere or for further use or processing.

Figure 2:
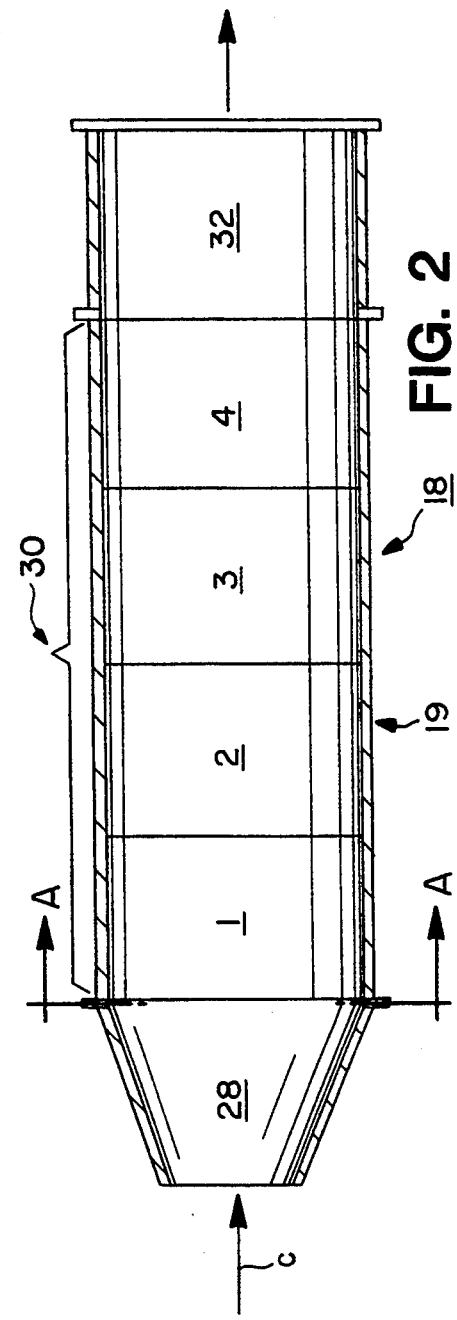
FIG. 2 is a schematic longitudinal cross-sectional view of one of the catalytic thermal combustors of FIG. 1 showing four cylindrical catalyst members arranged therein.
Figure 2A:
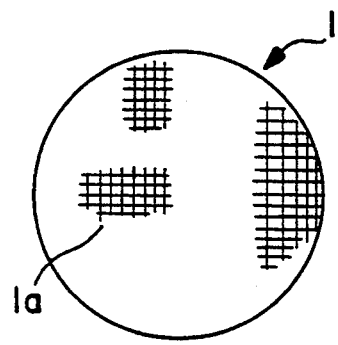
FIG. 2A is a view taken along line A—A of FIG. 2 showing a cross section of catalyst member 1 of FIG. 2.

FIG. 2 shows a schematic cross-sectional view of a typical catalytic thermal combustor 18 comprising a cannister 19 having an inlet section 28, a catalyst zone 30 comprising a catalyst body comprising catalyst members 1, 2, and 3, and a separator zone 31 including a separator body 4 and a downstream zone 32. The three catalyst members 1, 2, and 3, and separator body 4 are arranged in abutting contact. That is, catalyst members 1 and 2 are positioned in face-to-face abutting contact, as are catalyst members 2 and 3. Catalyst member 3 and separator body 4 are also in abutting contact. Generally, the catalyst members 1, 2, and 3 comprise a refractory carrier substrate formed into what is sometimes referred to as a monolithic or honeycomb substrate or carrier. The carrier is a substantially cylindrical body (see FIG. 2A) having opposite end faces between which extend a plurality of generally parallel, fine gas flow passages. FIG. 2A shows a typical catalyst member end face 1a of catalyst member 1, schematically showing a plurality of fine, parallel gas flow passages extending longitudinally through catalyst member 1 to permit gas flow through catalyst member 1. This construction is typical of all the catalyst members 1 through 3 inclusively. The gas flow passages are defined by walls on which are disposed a coating (often referred to as a "washcoat") of an active material suitable to catalyze the oxidation of a gaseous fuel such as natural gas or methane.

Figure 2B:
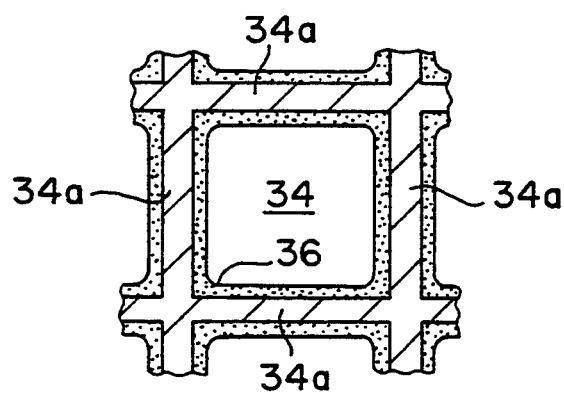
FIG. 2B is a view, greatly enlarged with respect to FIG. 2A, showing in cross section one of the gas flow channels of catalyst member 1.

FIG. 2B shows an enlarged view corresponding to FIG. 2A in which a typical gas flow passage 34 is shown in cross-sectional view as being defined by four gas flow passage walls 34a on which is coated a catalyst material washcoat 36. The cross-sectional configuration of gas flow passage 34 illustrated in FIG. 2B is rectangular but it will be appreciated that any suitable cross-sectional configuration may be employed such as square, polygonal, e.g., triangular, or circular. Further, the gas flow passages may have a configuration attained by alternating layers of flat and wave-form plates made of a suitable refractory material, as is well-known to those skilled in the art.

Preferably, separator body 4 is dimensioned and configured to provide gas flow channels that correspond with the channels in at least catalyst member 3, i.e., the catalyst member against which the separator body is disposed.

COMPARATIVE EXAMPLE 1

Two catalyst beds designated Bed A and Bed R, each comprising four segments designated 1-4 were prepared and arranged in a manner similar to the four segment arrangement of the catalyst section 30 of cannister 19 illustrated in FIG. 2. In each case, segment 1, e.g., A1, is positioned at the first or most upstream position and segment 4, e.g., A4, is positioned at the last or most downstream position, with segments 2 and 3 in sequence between them. In Bed A, the carrier substrate for each catalyst member A1 through A4 was a Type I carrier having 64 cells per square inch. The carrier in catalyst member A1 was coated with a catalyst composition comprising palladium oxide dispersed on pre-calcined, unimpregnated alumina, the washcoat containing 4% palladium by weight of the washcoat, as palladium oxide. Catalyst member A2 comprised a catalyst material comprising alumina particles that were co-impregnated with a solution of palladium nitrate and cerium nitrate, and then calcined to produce material comprising 8% palladium as palladium oxide and 10% ceria by weight. Catalyst members A3 and A4 each comprised an active layer comprising a catalyst material prepared from a physical mixture of alumina and the binary oxide solid state reaction product of lanthana and palladium oxide, the reaction product comprising 7 weight percent of the catalyst material. Catalyst members A1, A2 and A3 were disposed in abutting relation to each other. The catalyst members A1 and A3 were 1.5" in length; catalyst member A2 was 1" in length. Catalyst member A4 was separated from catalyst member A3 by a spacing member 1" in length. The spacing member was an annular body disposed about the periphery of catalyst members A3 and A4, leaving the gas flow area between these catalyst members unobstructed.

Catalyst Bed R was similar to catalyst Bed A except for the following: the coating on the segment R3 comprised 8 percent palladium oxide dispersed on a support comprising alumina impregnated with ceria, the ceria comprising 10% by weight of alumina and ceria combined; the coating on segment R4 comprised alumina without catalytically active metals thereon, to provide a separator body; and there was no spacing member between any of the segments.

The coating weight on each segment in both beds was 1.5 g/in$^3$. Each of the segments in beds A and R comprised the conventional alumina-silica-magnesia-type carrier monolith as described above, designated herein as Type I. The configurations of Beds A and R are summarized below in Table IA.

TABLE IA

| Segment | Carrier Type, | Length | Washcoat |
|---|---|---|---|
| Catalyst Bed A | | | |
| A1 | I | 1.5" | 4 wt. % Pd on alumina |
| A2 | I | 1" | 8 wt. % Pd on 10% ceria/alumina |
| A3 | I | 1.5" | 7 wt. % 2La$_2$O$_3$.PdO/alumina |
| A4 | I | 1.5" | 7 wt. % 2La$_2$O$_3$.PdO/alumina |
| Catalyst Bed R | | | |
| R1 | I | 1.5" | 4 wt. % Pd on alumina |
| R2 | I | 1" | 8 wt. % Pd on 10% ceria/alumina |
| R3 | I | 1.5" | 8 wt. % Pd on 10% ceria/alumina |
| R4 | I | 1.5" | alumina |

Bed A and Bed R were tested to determine their respective catalytic activities and durability with respect to aging.

To determine catalytic activity, the catalyst beds were placed in a combustor through which an air/fuel mixture comprising methane in air was introduced at fixed velocities as set forth in TABLE IB below. The temperature of the inlet stream was increased until complete combustion of the fuel was attained, this temperature being reported as the ignition temperature. Combustion was sustained for a duration of some hours as shown in TABLE IB, and the inlet temperature was then reduced until combustion was extinguished, and the extinction temperature was noted. In some instances, the fuel content of the combustion mixture was reduced as well. The results are set forth below in TABLE IB. The data for Bed R represents average values over 10 sustained inginitions.

TABLE IB

| Bed | Fuel[a] | Inlet[b] | Ign.[c] | Time[d] |

TABLE IB-continued

| A | Content | Vel. | Temp (°C.) | (hrs.) | Extinction |
|---|---------|------|------------|--------|------------|
| Run 1 | 4% | 30 ft/s | 455 | 2 | 445 |
| Run 2 | 4% | 30 ft/s | 490 | 6.5 | 435 |
| Run 3 | 3.9% | 30 ft/s | 490 | 2.5 | 496 (3.6% $CH_4$) |
| Run 4 | 4% | 30 ft/s | 570 | 3 | 582 (3.5% $CH_4$) |

| Bed R | Fuel[a] Content | Inlet[b] Vel. | Ign.[c] Temp (°C.) | Time[d] (total) (hrs.) | Extinction |
|---|---|---|---|---|---|
| Run 1 | 4% | 50 ft/s | 484–504 | 25 (total) | 463–482 (4.0%) 497–508 (3.8%) |

[a]Volume percent of methane in air.
[b]Linear velocity in feet per second of combustion gas at entry to catalyst beds.
[c]Ignition temperature in °C.
[d]Duration of combustion in hours.
[e]Temperature in °C. at which combustion was extinguished.

Segments A3, A4 and R3, R4 were all exposed to higher temperatures than segments A1, A2 and R1, R2, because segments 3 and 4 were disposed further downstream than the segments 1 and 2. As a result, segments 3 and 4 were expected to exhibit greater degradation upon use than segments 1 and 2. Sections of the used segments A3, R3, A4 and R4 were examined in comparison to unused, i.e., "fresh", samples of identical segments with regard to methane conversion activity, bulk assay for palladium and lanthanum content and SEM and microprobe analysis.

A. Catalytic Activity

The catalytic activities of the used samples employed to develop the data of TABLE IB and fresh samples of identical catalyst members were determined by cutting a test sample measuring ¾ inches in diameter and ½ inch in length from each spent catalyst member. The test samples were placed in a test combustion mixture stream comprising 1% methane in air having an inlet linear velocity of 20 feet per second. The inlet temperature of the combustion mixture was slowly raised and the temperatures which gave rise to 10, 20, 30 and 40 percent conversion of the inlet quantity of methane were noted, until a temperature of 700° C. was reached, at which temperature the methane conversion rate was noted. The results of this test are set forth below in TABLE IC. In cases where the actual methane conversion rate differs from the targeted rate of 10%, 20%, etc., the actual conversion rate is shown in parentheses.

TABLE IC

| (Type I Carriers) | Inlet Temperature at Indicated Conversion Rate | | | |
|---|---|---|---|---|
| | Target Methane Conversion Rate | | | |
| | 10% | 20% | 30% | 40% |
| Bed A | | | | |
| A3 | 678° C. | 700° C. (14.6%) | — | — |
| A4 | | 700° C. (8.8%) | — | — |
| Fresh | 602° C. | 700° C. (19%) | — | — |
| Bed B | | | | |
| R1 fresh | 405° C. | 470° C. | 530° C. | 618° C. |
| R2 = R3 fresh | 375° C. | 401° C. | 462° C. | 590° C. |
| R1-inlet | 489° C. | 560° C. | 628° C. | 700° C. (38%) |
| R1-outlet | 481° C. | 554° C. | 612° C. | 677° C. |
| R2-inlet | 464° C. | 535° C. | 606° C. | 700° C. |
| R2-outlet | 559° C. | 642° C. | 700° C. (28%) | — |
| R3-inlet | 498° C. | 587° C. | 666° C. | 700° C. (33%) |
| R3-outlet | 608° C. | 700° C. | — | — |

TABLE IC-continued

| (Type I Carriers) | Inlet Temperature at Indicated Conversion Rate | | | |
|---|---|---|---|---|
| | Target Methane Conversion Rate | | | |
| | 10% | 20% | 30% | 40% |
| | (18%) | | | |

The data of TABLE IC show that downstream catalyst members, i.e., segments A3, A4 and R3, especially the outlet or downstream portions thereof, lost catalytic activity after exposure of 14 hours (bed A) and 25 hours (bed R) to operating conditions.

2. Bulk Assay Results

The catalyst material on catalyst member A4 was assayed for palladium and lanthanum content and the results of the respective assays were compared to those for fresh samples. The catalyst material showed a loss of 85.5% of palladium content from the catalyst coating, but no loss of lanthanum.

3. SEM Microprobe/Mapping Results

Figure 3A:
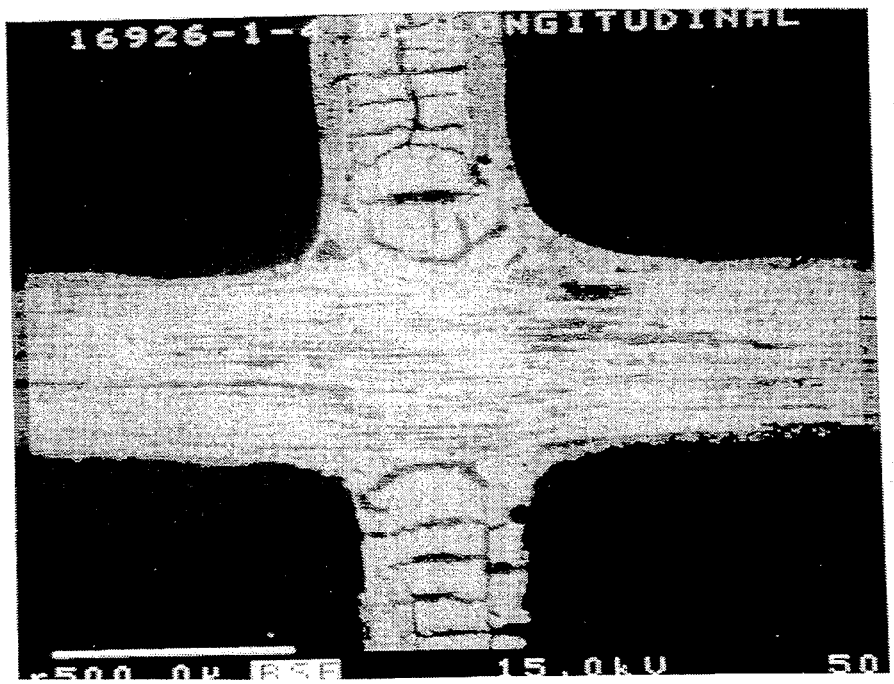
FIGS. 3A and 3B are SEM photographs of cross sections of fresh and spent catalyst members, respectively, from the catalyst bed of Comparative Example 1.
Figure 3B:
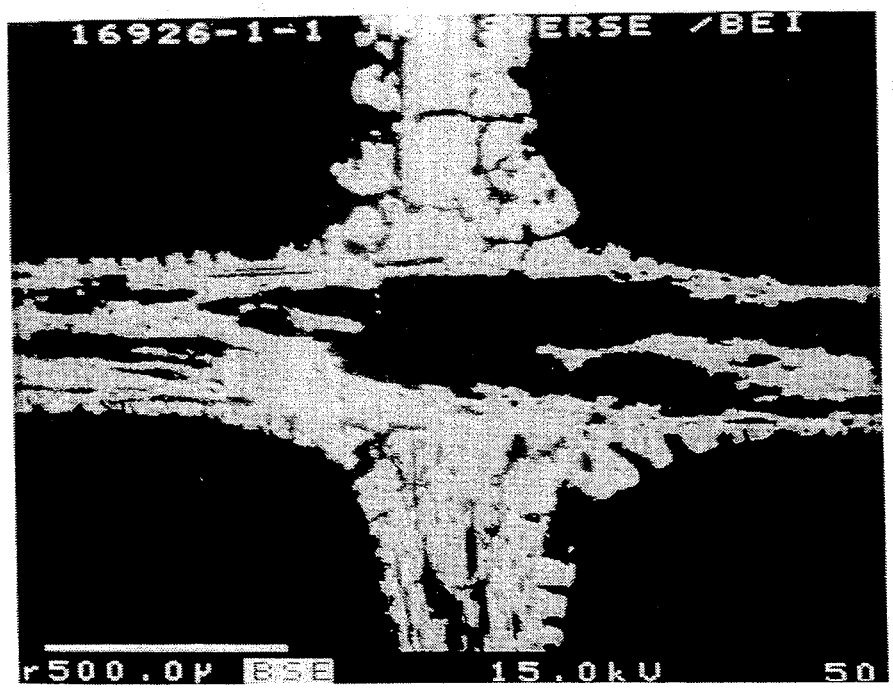

Sections of used or "spent" segments A3, R3 and R4 were examined by scanning electron microscope, as were samples of identical fresh catalyst members for comparison. The results were produced in the form of scanning electron microscope photographs, i.e., "SEM photos" of cross sections of the segments, which were visually examined for evidence of carrier or catalyst deterioration. The SEM photo for spent catalyst member A3 (comprising a Type I carrier) is shown on the attached FIG. 3B with an SEM photo of the fresh catalyst on a Type I carrier shown in FIG. 3A for comparison. It is clear from FIG. 3B that the Type I carrier suffered a deterioration in the constituent fibers during the duration of the activity test. In addition, it appears that the catalyst washcoat interacted with the carrier as evidenced by the apparent movement of the washcoat/carrier interface toward the center of the carrier structure. Finally, a microprobe was used to determine the presence of palladium in the fresh and spent samples. No palladium was detected in the spent sample. Similar washcoat/carrier interaction was evident from a comparison of SEM photos of fresh segments R3 and R4 with SEM photos of spent segments.

EXAMPLE 2

Two catalyst beds according to the present invention designated P and Q, were prepared generally in the manner described above in Example 1. However, the third segment of bed P comprised a stabilized carrier according to the present invention to inhibit interaction with the catalyst material carried thereon. For this catalyst bed, the stabilized carrier was prepared from a conventional Type I monolith which had been coated with alumina and then subjected to in situ combustion conditions. In particular, the monolith had been coated with 1.5 g/in³ alumina, dried, calcined, and placed as part of a 4 segment catalyst bed in a combustor which maintained catalytically supported combustion of a combustion mixture comprising 4% methane in air at a velocity of 60 ft/s for 2 hours 35 minutes, and for 2 hours 10 minutes at a velocity of 50 ft/s. Temperatures in the homogeneous combustion zone varied during the combustion run from about 1200° C. to 1400° C. The monolith was in the fourth segment in the bed, i.e., in the most downstream position.

Catalyst bed Q had four segments, all of which comprised stabilized carriers according to the present invention. The carriers of bed Q were stabilized ex situ, i.e., by coating conventional Type I monoliths with alumina and exposing the coated monolith to steam under stabilizing conditions. Specifically, the steam stabilized substrate was prepared by calcining the Type I monoliths substrates to 1300° C. for 8 hours; applying transition alumina as a washcoat for a loading of 1.5 g/in$^3$; calcining the thus coated Type I monolith to 500° C. for 2 hours and then to 1100° C. for 18 hours. Then, the coated monolith was subjected to steam in a flow of about 10% $H_2O$/air at 1300° C. for 12 hours. The catalyst coating applied to the steam stabilized washcoats were 1.7 to 2.0 g/in$^3$. The resulting stabilized carrier was then coated with washcoats of the materials indicated in TABLE IIA, in a manner as described above in Example 1.

The composition of the catalyst beds P and Q are summarized in the following Table IIA, wherein SD signifies an in situ stabilized carrier and SSD signifies an ex situ stabilized carrier.

TABLE IIA

| Catalyst Member | Substrate Type, | Length | Washcoat |
|---|---|---|---|
| | | | Catalyst Bed P |
| P1 | I | 1.5" | 4 wt. % Pd on alumina |
| P2 | I | 1" | 8 wt. % Pd on 10% ceria/alumina |
| P3 | SD | 1.5" | 8 wt. % Pd on 10% ceria/alumina |
| P4 | I | 1.5" | alumina |
| | | | Catalyst Bed Q |
| Q1 | SSD | 1.5" | 4 wt. % Pd on alumina |
| Q2 | SSD | 1" | 8 wt. % Pd on 10% ceria/alumina |
| Q3 | SSD | 1.5"" | 8 wt. % Pd on 10% ceria/alumina |
| Q4 | SSD | 1.5" | alumina |

The catalyst beds were placed in combustors in which catalyzed combustion was initiated. The conditions, duration, ignition and extinction conditions are summarized in the following TABLE IIB.

TABLE IIB

| Bed | No. Runs | Inlet Vel. | Ign. Temp (°C.) | Time (total) (hrs.) | Extinction °C./Fuel Conc % |
|---|---|---|---|---|---|
| P | 4 | 50 ft/s | 459–537 | 8.5 | 476° C./4.0% |
| Q | 12 | 50 ft/s | 452–485 | 21 | 472–481° C./4.0% (3.9%) |

The data of TABLE IIB show that catalyst beds according to the present invention can satisfactorily sustain catalyzed combustion of a fuel/air in combustion mixture.

Activity Results

After the catalyst beds were subjected to the combustion runs described above, the activity of the catalyst members was tested under a linear velocity of 20 ft/s in a 1% methane and air feed composition. The results are set forth below in TABLE IIC under the heading "Spent Segments". For comparison, test segments corresponding to segments P1 and Q1 were prepared by coating a conventional Type I carrier and a steam (ex situ) stabilized Type I carrier with a catalyst material comprising 4 weight percent Pd as PdO on alumina; test segments corresponding to segments P2 and Q2 were prepared by coating a conventional stabilized Type I carrier and steam stabilized carrier with a catalyst material comprising 8 weight percent Pd as PdO on ceria-stabilized alumina, as described in Example 1. The catalytic activities of these segments were tested without first placing them in a combustor, and the results are included in TABLE IIC under the heading "Fresh Segments".

TABLE IIC

| Member Bed | Temperature (°C.) @ % CH Conversion | | | | |
|---|---|---|---|---|---|
| | 10% | 20% | 30% | 40% | 50% |
| Fresh Segments | | | | | |
| P1 | 405° C. | 470° C. | 530° C. | 618° C. | 700° C. (45%) |
| Q1 | 394° C. | 442° C. | 490° C. | 554° C. | 700° C. (48%) |
| P2 | 375° C. | 401° C. | 462° C. | 590° C. | 700° C. (42%) |
| Q2 | 369° C. | 409° C. | 487° C. | 587° C. | 700° C. (50%) |
| Spent Segments | | | | | |
| Q1 | | | | | |
| -inlet | 475° C. | 525° C. | 573° C. | 625° C. | 700° C. |
| -outlet | 500° C. | 579° C. | 637° C. | 700° C. (37%) | — |
| Q2 | | | | | |
| -inlet | 402° C. | 450° C. | 531° C. | 660° C. | 700° C. (42%) |
| -outlet | 485° C. | 575° C. | 662° C. | 700° C. (34%) | — |
| Q3 | | | | | |
| -inlet | 481° C. | 600° C. | 662° C. | 700° C. (33%) | — |
| -outlet | 547° C. | 658° C. | 700° C. (26%) | — | — |
| P2 | 700° C. (5%) | | | | |
| P3 | 604° C. | 697° C. | 700° C. (26%) | | |

The data of TABLE IIC clearly indicate that the catalyst members prepared with steam stabilized carriers (Fresh Q1, Q2) provide catalytic activity which is comparable to catalyst members comprising conventional Type I carriers (Fresh P1, P2).

The post-combustion activity data of the spent segments show that steam ("ex situ") stabilized carriers according to the present invention provide adequate catalytic activity even after aging. In addition, a comparison of the activities of spent segments P2 and P3, which had the same catalyst material, shows that P3, which comprised a stabilized carrier, retained more activity than P2, despite having been positioned downstream of and therefore having been exposed to higher temperatures than, P2 in the combustor.

Characterization

Figure 4A:
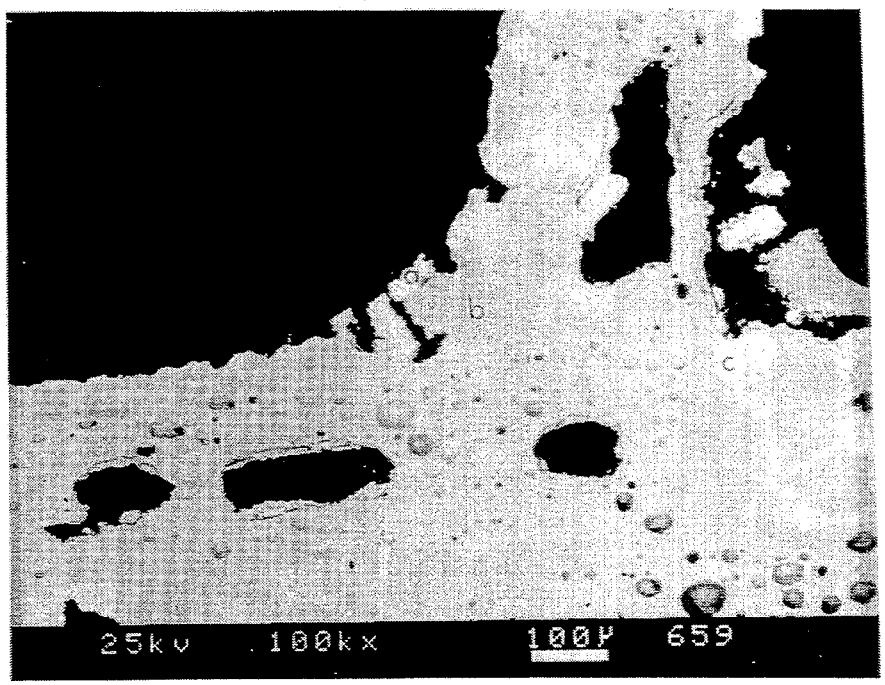
FIGS. 4A and 4B are SEM photographs of cross sections taken from segments 2 and 3 of Bed P of Example 3 respectively.
Figure 4B:
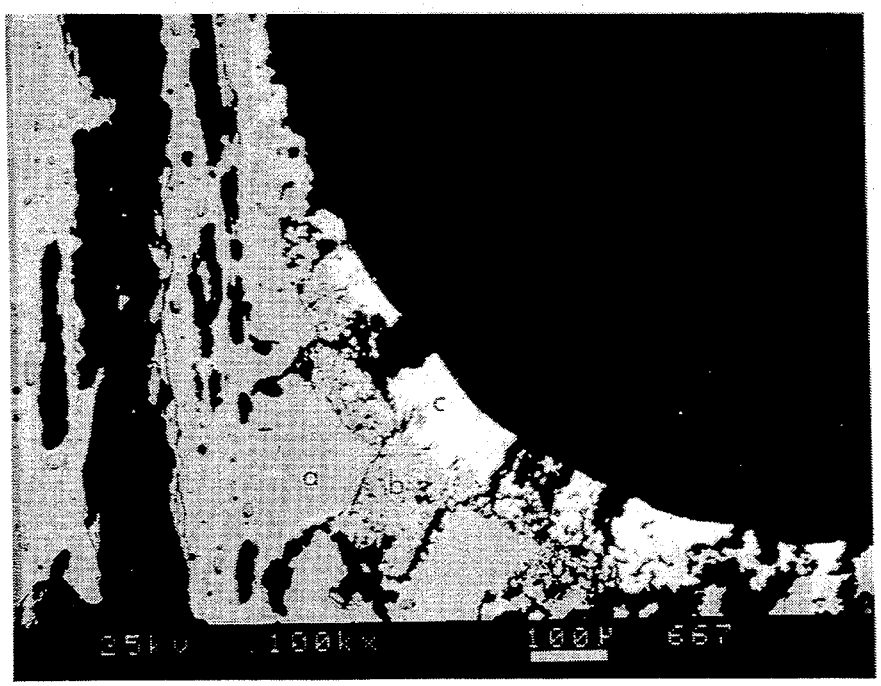
Figure 5A:
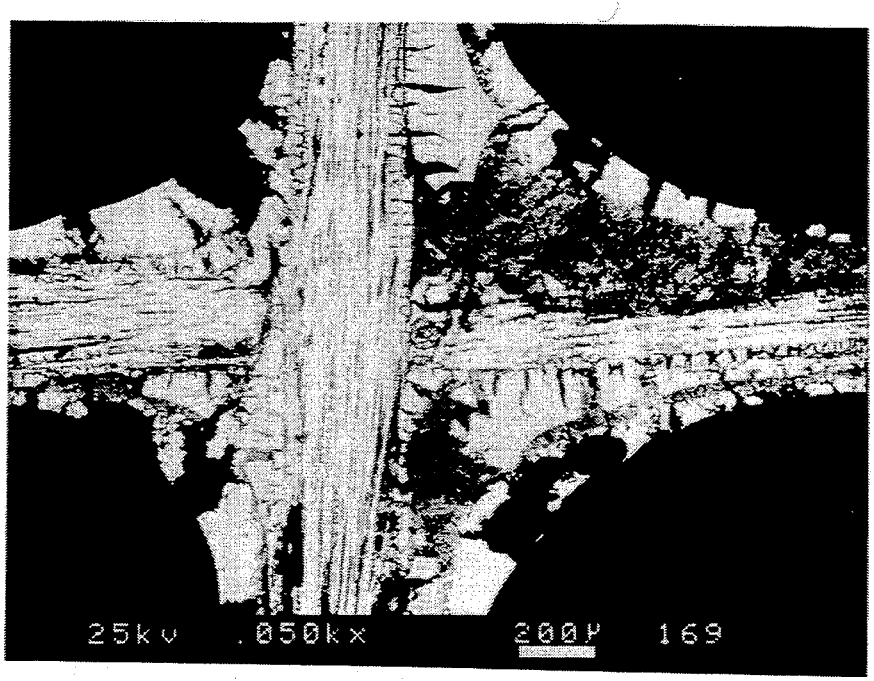
FIGS. 5A and 5B are SEM photographs of cross sections of spent catalyst member Q3 and Q4, respectively, of Example 3.
Figure 5B:
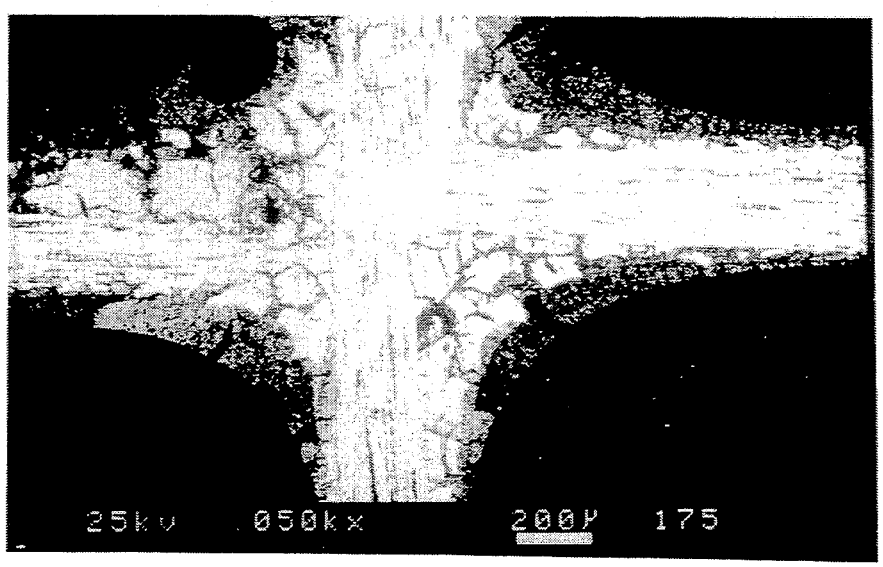

SEM/EDS results for segments 2 and 3 of bed P, see FIGS. 4A and 4B, respectively, were compared and revealed that segment 3, which was exposed to higher temperatures and steam concentrations during the course of combustion, exhibited superior washcoat adhesion and for less washcoat-substrate interaction than segment 2. SEM/EDS examination of the segments in bed Q, all of which comprised stabilized carriers, revealed little degradation of the substrates, even in segments 3 and 4 (FIGS. 5A and 5B respectively), which were periodically exposed to temperatures in excess of 1200° C. Further, in comparison with catalyst bed R, the data for catalyst bed Q supports the conclusion that steam-stabilized carriers retain more activity and show better washcoat adhesion in general than catalyst members comprising conventional Type I carriers, particularly in the segment number 3 position, despite having been exposed to very high temperatures during the course of operation. These results are confirmed even by comparing beds P and Q to bed A, which ran in the combustor for a total of only 14 hours, as opposed to the 21 hour run of bed Q.

In another trial, a catalyst bed similar to bed P was prepared, except that the in situ stabilized carrier had been stabilized by placement in the third position in the bed rather than in the fourth position. Also, after being stabilized, the carrier was coated with a catalyst material comprising 7 weight percent of a binary oxide of $2La_2O_3 \cdot PDO$ and 93 weight percent of a physical mixture of substantially equal molar quantities of $La_2O_3$ and alumina. After the segment was placed in a combustor bed, an SEM photo revealed some interaction between the catalyst material and the carrier, and there were large gaps in the substrate. It is unclear whether the gaps developed during the test or in the prior combustor run to provide the stabilized carrier. It is possible that because the carrier was stabilized in an upstream position relative to the carrier for segment P3 that it was not subjected to conditions as effective for stabilizing the carrier as for the P3 monolith.

The foregoing characterization studies show that in addition to providing comparable catalytic activity, stabilized carriers according to the present invention exhibit superior resistance to detrimental washcoat-carrier interaction, resulting in superior washcoat adhesion and better integrity than is achieved with conventional carrier substrates.

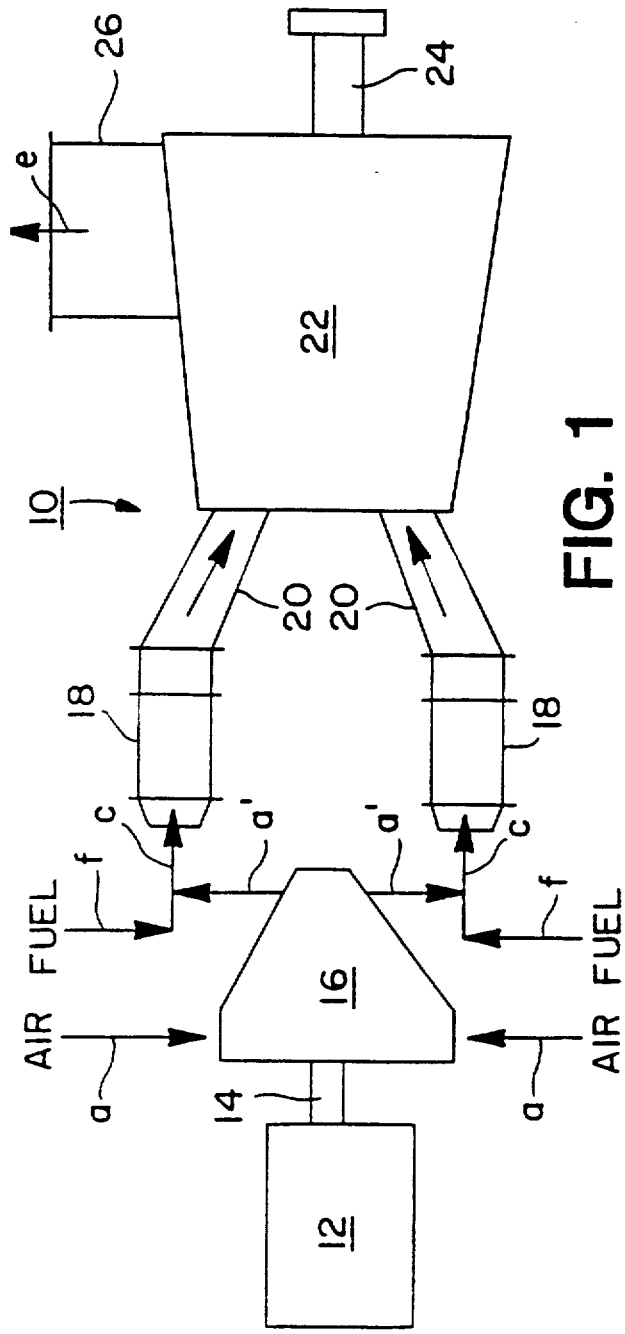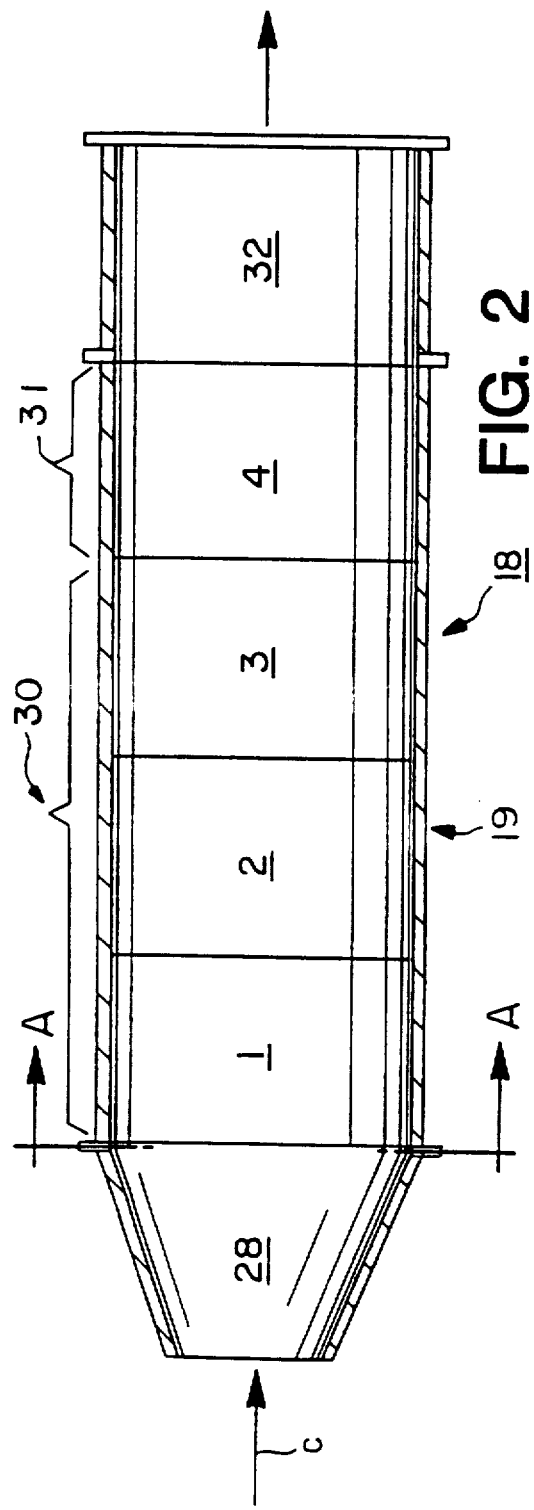

What is claimed is:

1. In a catalyst member comprising a carrier comprising a silica-alumina-magnesia material and having a plurality of gas flow passages extending therethrough defined by channel walls and a catalyst material comprising a catalytic component disposed on the channel walls and effective to catalytically support the combustion of a gaseous carbonaceous fuel, the improvement comprising that prior to applying the catalyst material to the carrier a coating comprising alumina is applied to the channel walls and the alumina-coated carrier is exposed to steam for a time and under conditions sufficient to induce the alumina to interact with the silica-alumina-magnesia material so that the carrier is stabilized against interaction with the catalyst material.

2. The catalyst member of claim 1 wherein the silica-magnesia-alumina material comprises from about 20 to 40 weight percent silica, from about 3 to 6 weight percent magnesia and from about 54 to 77 weight percent alumina, with from about 50 to 90 percent by weight of each of said silica, magnesia and alumina comprising crystalline material, the balance comprising amorphous material.

3. The catalyst member of claim 2 wherein the crystalline material comprises from about 15 to 40 percent by weight cordierite, from about 15 to 35 percent by weight corundum and from about 10 to 30 percent by weight mullite, based on the weight of the carrier.

4. The catalyst member of claim 1, claim 2 or claim 3 wherein exposure to steam comprises exposure to a mixture of from about 5% to 40% steam in-air at a temperature of from about 1200° C. to 1350° C. for a period of from about 2 to 60 hours at about 1 atm pressure.

5. The catalyst member of claim 4 wherein exposure to steam comprises exposure to a mixture of from about 5% to 15% steam in air at a temperature of from about 1250° C. to 1350° C. for a period of from about 2 to 24 hours at about 1 atm pressure.

6. The catalyst member of claim 5 wherein exposure to steam comprises exposure to about 10% steam in air at about 1300° C. for about 12 hours at about 1 atm pressure.

7. The catalyst member of claim 1 wherein the catalytic component comprises a palladium catalytic component.

8. The catalyst member of claim 1 or claim 7 wherein the catalyst material comprises alumina.

9. A method for making a catalyst member for use in the catalytically supported combustion of gaseous carbonaceous fuels, the method comprising preparing a stabilized carrier by applying a coating comprising alumina to the channel walls of a carrier comprising a silica-alumina-magnesia material and having a plurality of gas flow channels therethrough defined by channel walls and exposing the alumina-coated carrier to steam for a time and under conditions sufficient to induce the alumina to interact with the silica-alumina-magnesia material to stabilize the carrier against interaction with a catalyst material and thereafter applying a catalyst material comprising a catalytic component effective to catalytically support the combustion of a gaseous carbonaceous fuel to the channel walls of the stabilized carrier, to thereby produce the catalyst member.

10. The method of claim 9 wherein the silica-magnesia-alumina material comprises from about 20 to 40 weight percent silica, from about 3 to 6 weight percent magnesia and from about 54 to 77 weight percent alumina, with from about 50 to 90 percent by weight of each of said silica, magnesia and alumina comprising crystalline material, the balance comprising amorphous material.

11. The method of claim 10 wherein the crystalline material comprises from about 15 to 40 percent by weight cordierite, from about 15 to 35 percent by weight corundum and from about 10 to 30 percent by weight mullite, based on the weight of the carrier.

12. The method of claim 9, claim 10 or claim 11 wherein exposure to steam comprises exposure to a mixture of steam in air in a concentration of from about 5% to 40% steam in air at a temperature of from about 1200° C. to 1350° C. for a period of from about 2 to 60 hours at about 1 atm pressure.

13. The method of claim 12 wherein exposure to steam comprises exposure to a mixture of steam in air in a concentration of from about 5% to 15% steam in air at a temperature of from about 1250° C. to 1350° C. for a period of from about 2 to 24 hours at about 1 atm pressure.

14. The method of claim 13 wherein exposure to steam comprises exposure to about 10% steam in air at about 1300° C. for about 12 hours at about 1 atm pressure.

15. The catalyst member of claim 1 wherein the carrier comprises a honeycomb structure.

16. The method of claim 9 wherein the carrier comprises a honeycomb structure.

* * * * *

UNITED STATES PATENT AND TRADEMARK OFFICE
CERTIFICATE OF CORRECTION

PATENT NO. : 5,384,300

DATED : January 24, 1995

INVENTOR(S) : Feeley, et. al.

It is certified that error appears in the above-identified patent and that said Letters Patent is hereby corrected as shown below:

Drawings:

Delete Drawing sheet 1 of 5, and substitute therefor the drawing sheet, consisting of Figs. 1-2, as shown on the attached page.

Signed and Sealed this

Fourteenth Day of November, 1995

Attest:

BRUCE LEHMAN

*Attesting Officer*  *Commissioner of Patents and Trademarks*